United States Patent
Nayak et al.

(10) Patent No.: US 8,225,009 B1
(45) Date of Patent: Jul. 17, 2012

(54) SYSTEMS AND METHODS FOR SELECTIVELY DISCOVERING STORAGE DEVICES CONNECTED TO HOST COMPUTING DEVICES

(75) Inventors: Sathish Nayak, Pune (IN); Venkatesha Maphalamajalu Ganapathi, Pune (IN); Sumit Sharma, Pune (IN)

(73) Assignee: Symantec Corporation, Mountain View, CA (US)

(*) Notice: Subject to any disclaimer, the term of this patent is extended or adjusted under 35 U.S.C. 154(b) by 107 days.

(21) Appl. No.: 12/713,164

(22) Filed: Feb. 25, 2010

(51) Int. Cl.
*G06F 3/00* (2006.01)
*G06F 13/00* (2006.01)

(52) U.S. Cl. .............. 710/15; 710/8; 710/33; 710/36; 710/62

(58) Field of Classification Search ................. None
See application file for complete search history.

(56) References Cited

U.S. PATENT DOCUMENTS

2007/0192466 A1* 8/2007 Nahum ............... 709/223
2008/0091816 A1* 4/2008 Mimatsu et al. ..... 709/223

OTHER PUBLICATIONS

Fibre Channel Storage Area Network Discovery, Sep. 10, 1999, Brocade Communication Systems, [online, accessed on Oct. 2, 2011], URL: http://www.t11.org/ftp/t11/member/fc/gs-3/99-553v0.pdf.*

* cited by examiner

*Primary Examiner* — Scott Sun
(74) *Attorney, Agent, or Firm* — Advantedge Law Group (57) ABSTRACT

A computer-implemented method for selectively discovering storage devices connected to a host computing device may include: 1) identifying at least one storage device connected to the host computing device that provides storage for at least one resource managed by the host computing device, 2) identifying a discovery classification assigned to the storage device that is based at least in part on an availability requirement associated with the resource, and then 3) discovering the storage device in accordance with the discovery classification assigned to the storage device. Various other methods, systems, and configured computer-readable media are also disclosed.

20 Claims, 7 Drawing Sheets

Availability-Requirements File
122

```
------------------------------------------------------------
**************************************************
Service/Application:  unnecessary_application
Availability Requirement:  Post-Startup
Priority Ranking:  4
**************************************************
**************************************************
Service/Application:  critical_service
Availability Requirement:  Phase-0 Startup
Priority Ranking:  1
**************************************************
**************************************************
Service/Application:  unnecessary_service
Availability Requirement:  As-Needed
Priority Ranking:  5
**************************************************
**************************************************
Service/Application:  required_application
Availability Requirement:  Phase-1 Startup
Priority Ranking:  3
**************************************************
**************************************************
Service/Application:  required_service
Availability Requirement:  Phase-0 Startup
Priority Ranking:  2
**************************************************
**************************************************
------------------------------------------------------------
```

*FIG. 4*

Discovery-Classification File
124

```
---------------------------------------------------------------------------
****************************************************
Device Identifier: 600508B400014A110001900087A10000
Discovery Classification: Post-Startup
****************************************************

****************************************************
Device Identifier: 098B0DE09B09D0F0980823234234023
Discovery Classification: Phase-1 Startup
****************************************************

****************************************************
Device Identifier: 91239D9B90923409FE098D098119323
Discovery Classification: As-Needed
****************************************************

****************************************************
Device Identifier: 1234098AD983098F3092900823409FA
Discovery Classification: Phase-0 Startup
****************************************************

****************************************************
Device Identifier: 094350982AF23424F97854AD2343E30
Discovery Classification: Synchronous
****************************************************

SYSTEMS AND METHODS FOR SELECTIVELY DISCOVERING STORAGE DEVICES CONNECTED TO HOST COMPUTING DEVICES

BACKGROUND

In modern data centers, typical host-based storage virtualization solutions must "discover" potentially thousands of logical unit numbers (LUNs) carved from multiple storage arrays attached to a host device before the host's file system (or applications or services that store data in these LUNs) is available to users. Unfortunately, this device-discovery process may significantly delay the host's startup process, resulting in increased downtime, expanded maintenance windows, and potentially compromised customer service level agreement (SLA) uptime requirements.

While some host-based storage virtualization solutions may allow users to exclude storage devices from the discovery process, these solutions typically do not load during the host's startup process. As such, these solutions may fail to enable users to selectively discover storage devices during a host's startup process. Accordingly, the instant disclosure identifies a need for systems and methods for improving the device-discovery process of host computing devices, such as cluster nodes within a clustered computing environment.

SUMMARY

As will be described in greater detail below, the instant disclosure generally relates to systems and methods for selectively discovering storage devices connected to a host computing device in order to improve startup performance. In one example, the various systems described herein may accomplish such a task by: 1) identifying at least one storage device (such as a logical storage device within a virtualized storage environment) connected to a host computing device (such as a cluster node within a clustered computing environment) that provides storage for at least one resource (such as an application or service) managed by the host computing device, 2) identifying a discovery classification assigned to the storage device (such as whether to discover the device during or after startup) that is based at least in part on an availability requirement associated with the resource, and then 3) discovering the storage device in accordance with the discovery classification assigned to the storage device.

In some examples, the systems described herein may identify both the storage device (using, e.g., a unique identifier) and the discovery classification associated with the storage device by accessing and parsing a configuration file. As will be explained in greater detail below, storage-device identifiers and discovery classifications may be user or machine-generated.

In some examples, the availability requirement may represent a user or machine-assigned availability requirement that specifies when a specific resource (such as an application or service) should be made available by the host computing device. For example, a user may manually specify (or the systems described herein may automatically specify) that a specific resource should be made available during startup of the host computing device (i.e., synchronous with respect to system startup), during a specific startup phase (e.g., "Phase-0" or "Phase-1") of the host computing device, after startup of the host computing device is complete (i.e., asynchronous with respect to system startup), and/or in accordance with a priority ranking associated with the resource.

Similarly, the discovery classification may represent a user or machine-assigned discovery classification that specifies when a particular storage device should be discovered by the host computing device. For example, a user may manually specify (or the systems described herein may automatically specify) that a specific resource should be discovered during startup of the host computing device, during a specific startup phase of the host computing device, after startup of the host computing device is complete, and/or on an as-needed basis. In some examples, the discovery classification may be assigned to the storage device based at least in part on the availability requirement associated with the resource for which the storage device provides storage. For example, the systems described herein may specify that a storage device that provides storage for a critical application or service is to be made available during an early or initial startup phase of the host computing device in order to ensure that the critical application or service can be made available as soon as possible.

In some examples, the device-discovery process may also include: 1) identifying a disk group associated with the storage device and then 2) discovering all other storage devices within the identified disk group. In one example, the systems described herein may configure the storage device for use by an application or service upon discovering the device. In this example, the systems described herein may also make the application or service available upon discovering and configuring the storage device. For example, the systems described herein may make the application or service available in accordance with a priority ranking associated with the application or service.

As will be explained in detail below, by configuring host computing devices to selectively discover storage devices during startup based at least in part on the availability requirements of applications or services that store data on such devices, the systems and methods described herein may enable system administrators to drastically improve the startup performance of host computing devices without compromising the availability requirements of applications or services managed by such host computing devices. As such, these systems and methods may enable cluster management and storage virtualization software vendors to provide solutions that satisfy the uptime requirements of stringent SLAs, even in large-scale environments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
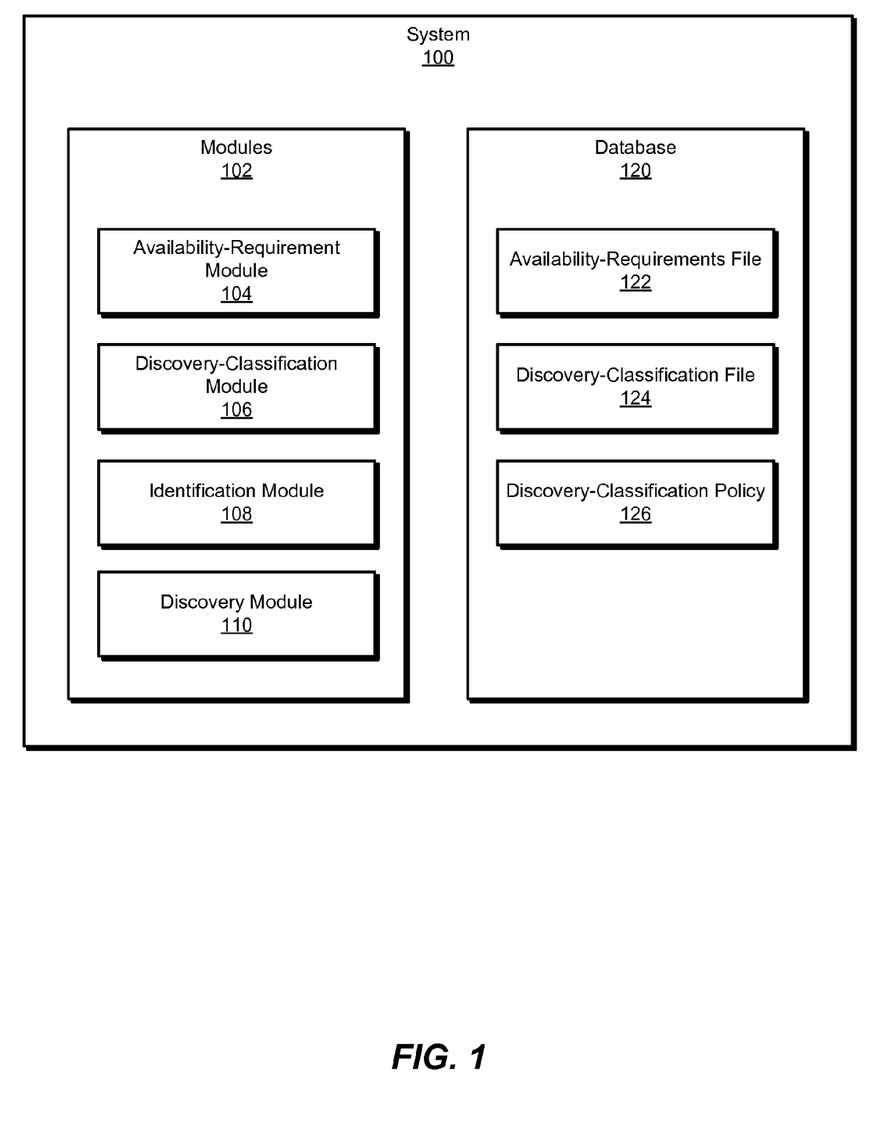
FIG. 1 is a block diagram of an exemplary system for selectively discovering storage devices connected to host computing devices.
Figure 2:
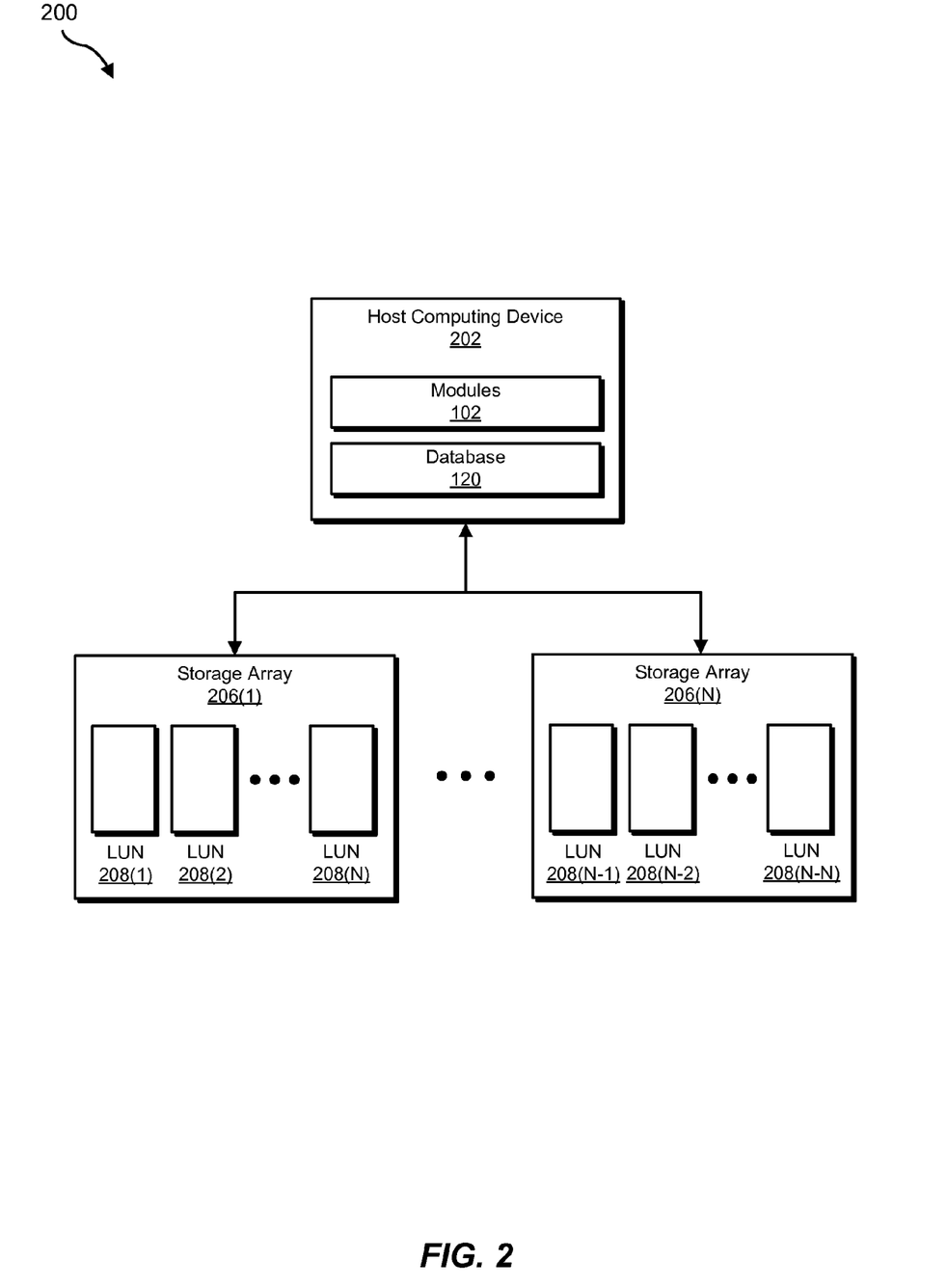
FIG. 2 is a block diagram of an exemplary system for selectively discovering storage devices connected to host computing devices.

The following will provide, with reference to FIGS. 1-2, detailed descriptions of exemplary systems for selectively discovering storage devices connected to host computing devices. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for selectively discovering storage devices connected to host computing devices. As illustrated in this figure, exemplary system 100 may include one or more modules 102 for performing one or more tasks. For example, and as will be explained in greater detail below, exemplary system 100 may include an availability-requirement module 104 programmed to identify the availability requirements of resources (such as applications or services) managed by a host computing device. Exemplary system 100 may also include a discovery-classification module 106 that is programmed to assign a discovery classification to a storage device connected to the host computing device based at least in part on an availability requirement associated with the resource for which the storage device provides storage.

In addition, and as will be described in greater detail below, exemplary system 100 may include an identification module 108 programmed to identify (e.g., during startup of the host computing device) the discovery classifications assigned to one or more storage devices connected the host computing device. Exemplary system 100 may also include a discovery module 110 programmed to discover storage devices in accordance with their assigned discovery classifications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., host computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more configuration or policy files, such as availability-requirements file 122, discovery-classification file 124, and/or discovery-classification policy 126, as will be described in greater detail below. Database 120 may represent portions of a single database or computing device or a plurality of databases or computing devices. For example, database 120 may represent a portion of host computing device 202 in FIG. 2, computing system 610 in FIG. 6, and/or portions of exemplary network architecture 700 in FIG. 7. Alternatively, database 120 in FIG. 1 may represent one or more configuration files hosted on one or more physical devices capable of being accessed by a computing device, such as host computing device 202 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of exemplary system 200 in FIG. 2. As shown in FIG. 2, system 200 may include a host computing device 202 in communication with one or more storage arrays 206(1)-(N). In one embodiment, and as will be described in greater detail below, modules 102 may program host computing device 202 to selectively discover storage devices during startup in order to improve the startup performance of host computing device 202.

For example, modules 102 may (as part of, for example, a storage virtualization application and/or cluster management application on host computing device 202) cause host computing device 202 to: 1) identify at least one storage device (e.g., LUN 208(1) of storage array 206(1)) connected to host computing device 202 that provides storage for at least one resource (such as an application or service) managed by host computing device 202, 2) identify a discovery classification assigned to the storage device that is based at least in part on an availability requirement associated with the resource for which the storage device provides storage, and then 3) discover the storage device in accordance with the discovery classification assigned to the storage device.

Host computing device 202 generally represents any type or form of computing device that is capable of managing data. Examples of host computing device 202 include, without limitation, application servers and/or database servers configured to provide various database services and/or run certain software applications. In some examples, host computing device 202 may represent a cluster node within a clustered computing environment.

In one example, modules 102 may represent portions of a storage virtualization application and/or cluster management application executing on host computing device 202. Examples of suitable storage virtualization applications include, without limitation, VERITAS VOLUME MANAGER, HP LOGICAL VOLUME MANAGER, ZFS, SOLARIS VOLUME MANAGER, or the like. Similarly, examples of suitable cluster management applications include, without limitation, VERITAS CLUSTER SERVER, HP SERVICEGUARD, SOLARIS CLUSTER, or the like.

Storage arrays 206(1)-(N) generally represent any storage system or device (such as a disk array) capable of storing data for a host computing system (such as data for applications or services managed by a host computing system). In one example, storage arrays 206(1)-(N) may be logically divided into a plurality of LUNs 208(1)-208(N-N), each of which may represent a logical reference to a physical portion of storage arrays 206(1)-(N). LUNs 208(1)-208(N-N) may represent a disk, a section of a disk, an entire disk array, and/or a section of a disk array within storage arrays 206(1)-(N).

Figure 3:
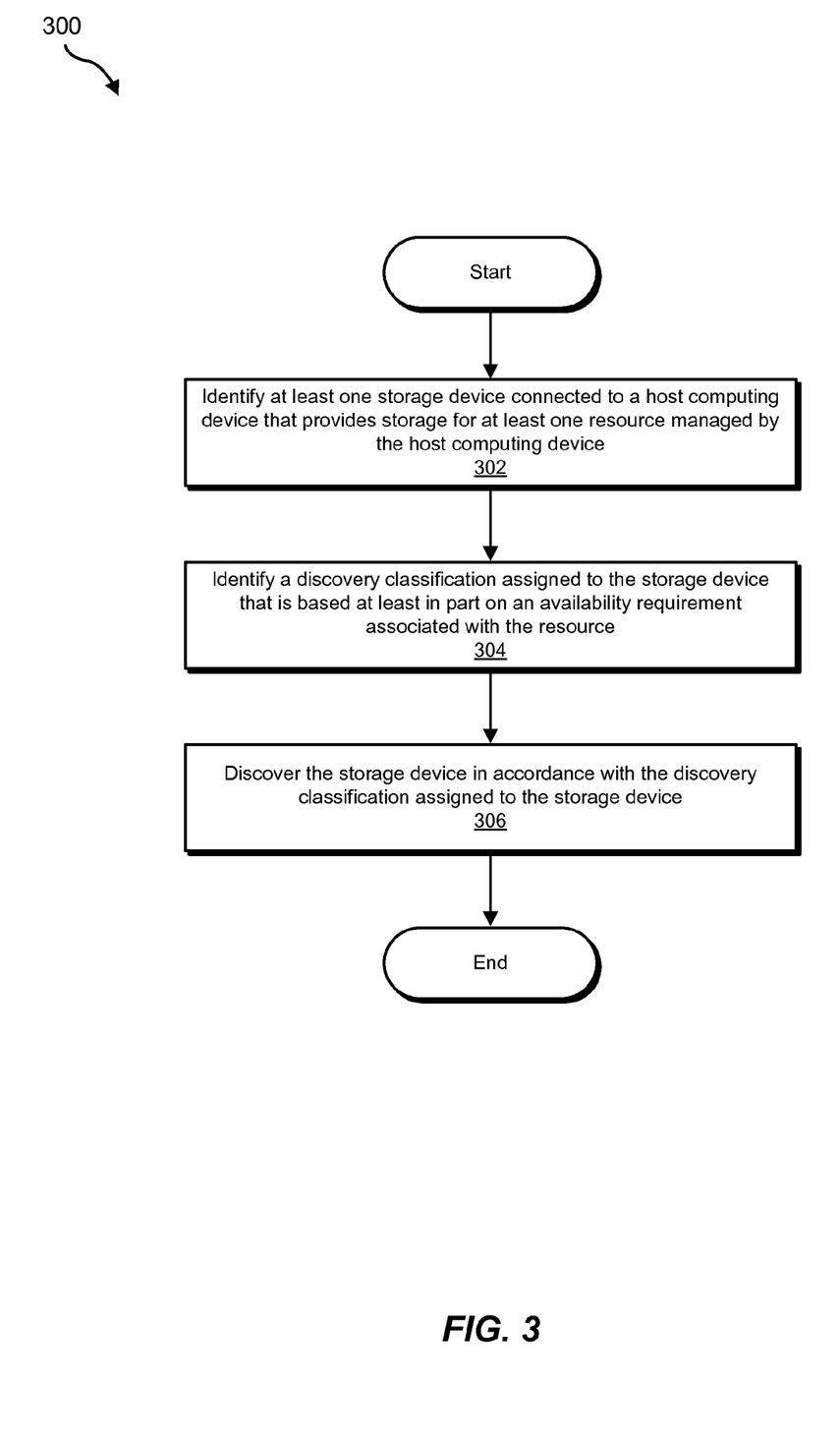
FIG. 3 is a flow diagram of an exemplary method for selectively discovering storage devices connected to host computing devices.

FIG. 3 is a flow diagram of an exemplary computer-implemented method 300 for selectively discovering storage devices connected to host computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in this figure, at step 302 one or more of the various systems described herein may identify at least one storage device connected to a host computing device that provides storage for at least one resource managed by the host computing device. For example, identification module 108 in FIG. 1 may, as part of host computing device 202 in FIG. 2 (e.g., as part of a storage virtualization application on host computing device 202), identify a physical or logical storage device (such as LUN 208(1) of storage array 206(1)) that provides storage for at least one application or service managed by host computing device 202.

The systems described herein may perform step 302 in a variety of ways and in a variety of contexts. For example, in one embodiment the systems described herein may perform step 302 (along with steps 304 and 306, as will be described in greater detail below) during startup of a host computing device. For example, identification module 108 may, as part of host computing device 202, identify storage devices connected to host computing device 202 that are to be selectively discovered by discovery module 110 during startup of host computing device 202. In this example, identification module 108 and discovery module 110 may improve the startup performance of host computing device 202 by selectively identifying and discovering storage devices during startup, as will be explained in greater detail below.

Figure 5:
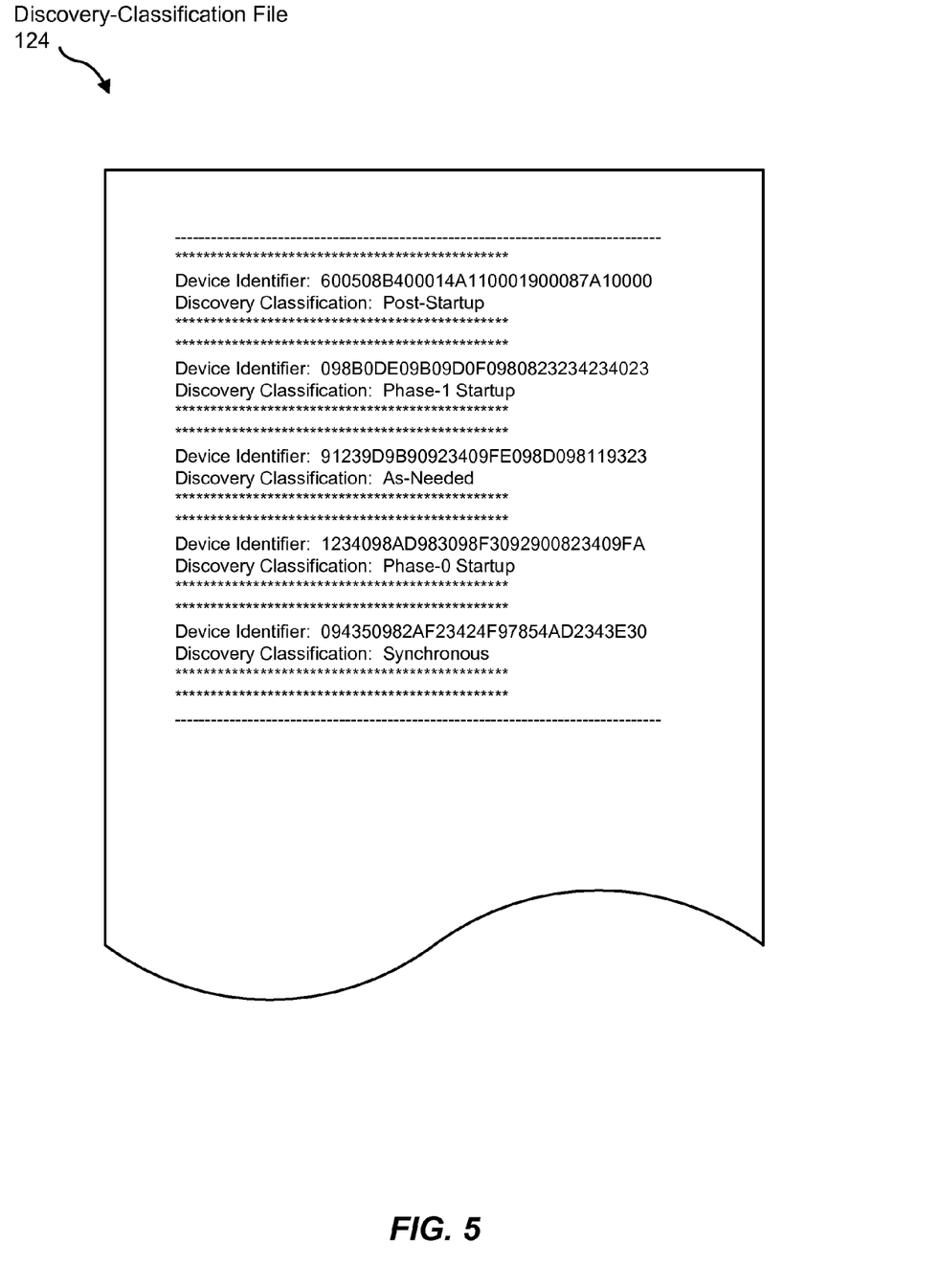
FIG. 5 is an illustration of an exemplary file that identifies the discovery classifications assigned to storage devices connected to a host computing device.

In one example, the systems described herein may identify a storage device in step 302 by parsing a configuration file that uniquely identifies each storage device that provides storage for resources (such as applications and services) managed by the host computing device. For example, identification module 108 in FIG. 1 may identify each storage device that provides storage for resources managed by host computing device 202 in FIG. 2 by parsing discovery-classification file 124 in FIG. 5. As illustrated in FIG. 5, discovery-classification file 124 may identify, for each storage device that provides storage for resources managed by host computing device 202: 1) a unique device identifier associated with the storage device (e.g., "600508B400014A110001900087A10000") and 2) a discovery classification (e.g., "Post-Startup") assigned to the storage device, as will be explained in greater detail below. As explained below, discovery-classification file 124 may be user or machine-generated.

The phrase "unique identifier," as used herein, may refer to any method for uniquely identifying storage devices. In some examples, unique identifiers may uniquely identify storage devices across system reboots, name variations, physical locations, multiple underlying paths, or the like. As will be explained in greater detail below, in some examples identification module 108 and/or discovery module 110 may use these unique identifiers to uniquely identify storage devices connected to host computing device 202.

The storage devices identified in step 302 may represent any type or form of storage system or device capable of storing data for resources (such as applications or services) managed by a host computing device. Examples of such storage devices include, without limitation, physical storage devices (such as a disk, a section of a disk, an entire disk array, and/or a section of a disk array) and logical storage devices within a virtualized storage environment (such as LUNs of a disk array).

As detailed above, in some examples these storage devices may provide storage for one or more resources managed by a host computing device. The term "resource," as used herein, may refer to any application, service, database, or the like that may be managed by a host computing device. In some examples, and as explained in detail above, this host computing device may represent a cluster node within a clustered computing environment.

Returning to FIG. 3, at step 304 the systems described herein may identify a discovery classification assigned to the storage device that is based at least in part on an availability requirement associated with the resource. For example, identification module 108 in FIG. 1 may, as part of host computing device 202 in FIG. 2 (e.g., as part of a storage virtualization application on host computing device 202), identify a discovery classification assigned to the storage device identified in step 302 (e.g., LUN 208(1)) that is based at least in part on an availability requirement of an application or service for which the identified storage device provides storage.

The phrase "discovery classification," as used herein, may refer to a classification that specifies when a storage device attached to a host computing device is to be discovered and/or configured by the host computing device. For example, a discovery classification may specify that a storage device is to be discovered during (i.e., synchronous with respect to) startup of a host computing device (e.g., for boot devices), during a specific startup phase of a host computing device (e.g., "Phase-0" or "Phase-1"), after startup of a host computing device is complete (e.g., in a background thread or process), on an as-needed basis (e.g., as required by the applications or services for which the storage device provides storage), or at any other point in time or in accordance with any predetermined order.

The systems described herein may perform step 304 in a variety of ways and in a variety of contexts. In one example, identification module 108 may perform step 304 by retrieving a discovery classification assigned to the storage device identified in step 302 from a configuration file, such as discovery-classification file 124 in FIG. 5. For example, identification module 108 may determine, by analyzing or parsing discovery-classification file 124, that a storage device having the device identifier "1234098AD983098F3092900823409FA" has been assigned a discovery classification of "Phase-0 Startup," which, as will be described in greater detail below, may indicate that this storage device is to be discovered by host computing device 202 during its initial startup phase.

Discovery-classification file 124 in FIG. 5 may be user or machine-generated. For example, a system administrator of host computing device 202 may assign specific discovery classifications to each storage device connected to host computing device 202 based at least in part on the applications or services serviced by each specific storage device. For example, a system administrator of host computing device 202 may determine that a storage device having the device identifier "1234098AD983098F3092900823409FA" provides storage for a critical service that is required during startup of host computing device 202. In this example, the system administrator may assign (via, e.g., discovery-classification module 106, which may, as detailed above, represent a portion of a storage virtualization or cluster management application) a discovery classification of "Phase-0 Startup" to the storage device (which discovery classification, as will be described in greater detail below, may indicate that this storage device is to be discovered during an initial startup phase of host computing device 202).

In an additional embodiment, the systems described herein may automatically generate discovery-classification file 124 in FIG. 5. In one example, the systems described herein may automatically generate this file by: 1) identifying an availability requirement associated with each resource managed by the host computing device and then 2) assigning a discovery classification to each storage device based at least in part on the availability requirement of the resource (or resources) for which the storage device provides storage. For example, availability-requirement module 104 and/or discovery-classification module 106 in FIG. 1 may, as part of host computing device 202 in FIG. 2 (e.g., as part of a cluster management application on host computing device 202), identify or determine the availability requirement of each application or service for which a particular storage device provides storage and then automatically assign a discovery classification to each storage device based at least in part on the availability requirement of each application or service for which a particular storage device provides storage.

The phrase "availability requirement," as used herein, may refer to when a resource (such as an application or service) managed by a host computing device should be made available for use. For example, an availability requirement may specify that a resource managed by a host computing device should be made available during startup of the host computing device (e.g., for critical or required applications or services), during a specific startup phase of the host computing device (e.g., "Phase-0" or "Phase-1"), after startup of the host computing device is complete (e.g., for non-critical services or applications), and/or in accordance with a priority ranking associated with the resource in question.

In some examples, availability requirements may be assigned to a resource (such as an application or service) by a user of the host computing device. For example, a user of host computing device 202 may specify (via, e.g., availability-requirement module 104 in FIG. 1, which may, as detailed above, represent a portion of a cluster management application) that a critical application or service should be made available during an initial startup phase (e.g., "Phase-0") of host computing device 202. In other examples, the systems described herein may automatically assign availability requirements to resources managed by a host computing device. For example, availability-requirement module 104 in FIG. 1 may, as part of host computing device 202 in FIG. 2 (e.g., as part of a cluster management application on host computing device 202), specify that known-critical applications and services should be made available during an initial startup phase (e.g., "Phase-0") of host computing device 202.

Figure 4:
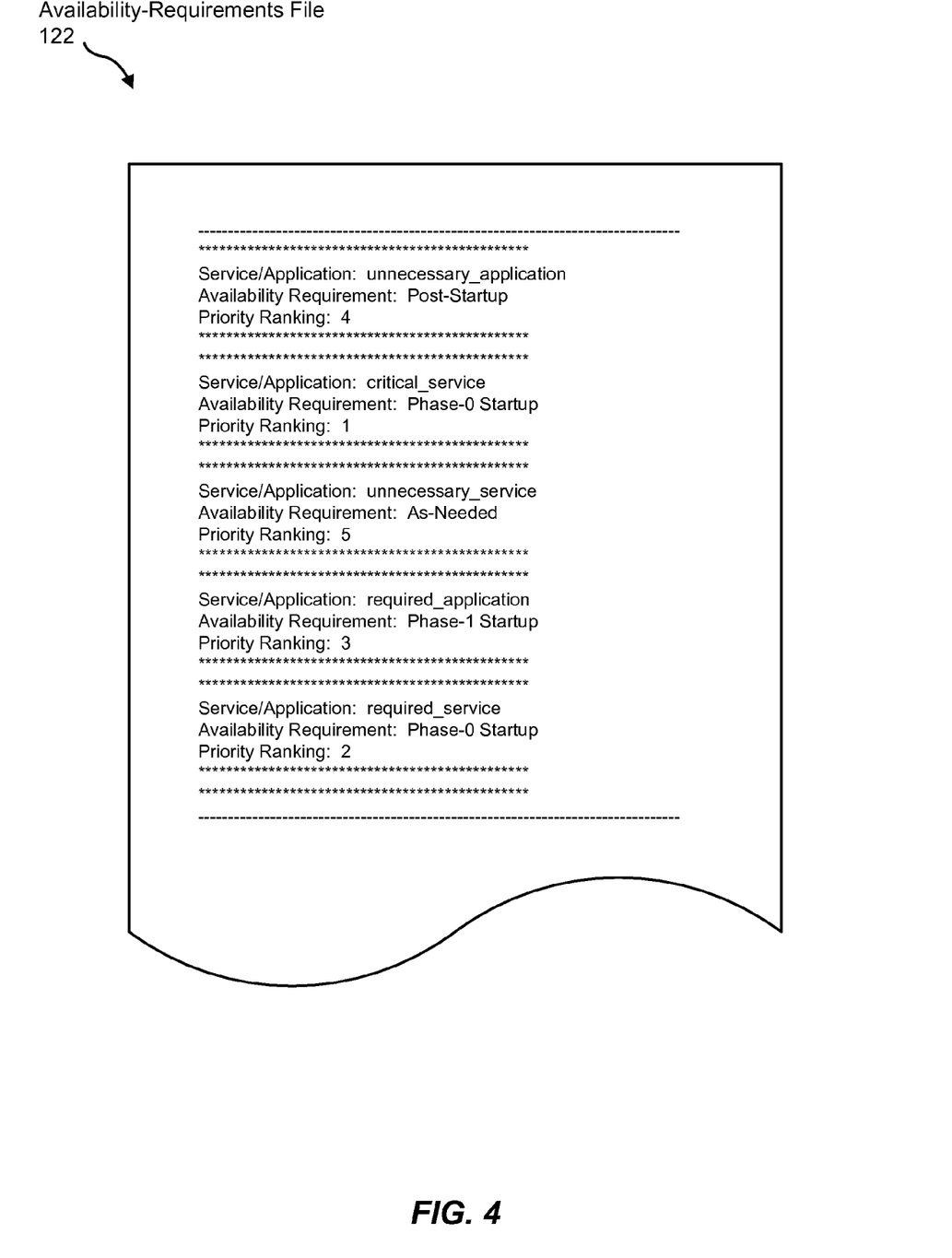
FIG. 4 is an illustration of an exemplary file that identifies the availability requirements of resources managed by a host computing device.

In at least one example, the availability requirements assigned to each resource managed by host computing device 202 may be stored in a configuration file, such as availability-requirements file 122 in FIG. 4. As illustrated in FIG. 4, availability-requirements file 122 may contain information that identifies, for each service or application managed by host computing device 202, a priority ranking (e.g., 1-100) and/or an availability requirement assigned to the application (e.g., "Phase-0 Startup," "Phase-1 Startup," "Post-Startup," and "As-Needed").

In one example, a priority ranking assigned to a service or application may specify when the application or service is to be made available relative to the other applications or services managed by host computing device 202. For example, availability-requirements file 122 in FIG. 4 may specify that the service "critical_service" is to be made available during an initial startup phase (e.g., "Phase-0") of host computing device 202 and before all other applications or resources managed by host computing device 202 are made available since, in this example, this application or service has been assigned a priority ranking of "1" and an availability requirement of "Phase-0 Startup." Availability-requirements file 122 may also specify that the service "unnecessary_service" is to be made available on an "as-needed" basis after all other applications or services managed by host computing device 202 have been made available since this application or service has been assigned an availability requirement of "As-Needed" and a priority ranking of "5" (which, in this example, is lower than all other applications or services identified within availability-requirements file 122).

As detailed above, in some examples the systems described herein may automatically assign a discovery classification to a storage device based at least in part on an availability requirement assigned to a resource for which the storage device provides storage. For example, discovery-classification module 106 in FIG. 1 may, as part of host computing device 202 in FIG. 2 (e.g., as part of a cluster management application on host computing device 202), assign the discovery classification "Phase-0 Startup" to a storage device that provides storage for a resource (such as a critical application or service) that must be made available during an initial startup phase of host computing device 202.

The systems described herein may assign discovery classifications to storage devices in a variety of ways and in a variety of contexts. For example, in one embodiment discovery-classification module 106 may assign a discovery classification to a storage device based at least in part on an availability requirement associated with a resource for which the storage device provides storage. For example, discovery-classification module 106 may assign a discovery classification "Phase-0" to a storage device that provides storage for an application having an availability requirement of "Phase-0." Similarly, discovery-classification module 106 may translate a priority ranking assigned to an application or service into a discovery classification for a storage device that provides storage for the application or service. For example, discovery-classification module 106 may assign the discovery classification "SYNC" (indicating that the device is to be discovered during, or synchronous with respect to, startup of the host computing device) to all storage devices that provide storage for applications having priority ratings of between 1-10. In contrast, discovery-classification module 106 may assign a discovery classification of "ASYNC" (indicating that the storage device is to be discovered after, or asynchronous with respect to, startup of the host computing device) to all storage devices that provide storage for applications or services having priority ratings that exceed 10.

In some examples, the systems described herein may assign a discovery classification to a storage device based at least in part on a tiered-storage classification associated with or assigned to the storage device. For example, a user or system-defined policy may specify that all tier-1 storage devices (e.g., boot devices or storage devices that provide storage for critical applications or services) should be discovered by the host computing device during an initial startup phase (e.g., "Phase-0"). Similarly, this policy may specify that all tier-2 storage devices (e.g., storage devices that provide storage for required applications and services) should be discovered during a subsequent startup phase (e.g., "Phase-1") of the host computing device, with all other storage devices (e.g., tier-3 storage devices) to be discovered after startup of the host computing device is complete (e.g., on an as-needed basis).

Returning to FIG. 3, at step 306 the systems described herein may discover the storage device in accordance with the discovery classification assigned to the storage device. For example, discovery module 110 in FIG. 1 may, as part of host computing device 202 in FIG. 2 (e.g., as part of a storage virtualization application on host computing device 202), discover the storage device identified in step 302 in accordance with the discovery classification identified in step 304.

The systems described herein may discover storage devices in accordance with discovery classifications in a variety of ways and in a variety of contexts. For example, discovery module 110 may discover the storage device identified in step 302 during startup of the host computing device (i.e., synchronous with respect to system startup), during a specific startup phase of the host computing device, after startup of the host computing device is complete (i.e., asynchronous with respect to system startup), and/or on an as-needed basis. For example, discovery module 110 may discover a storage device having the device identifier "0943509828AF23424F97854AD2343E30" during startup of host computing device 202 (i.e., synchronous with respect to system startup). Similarly, discovery module 110 may discover a storage device having the device identifier "098B0DE09B09D0F0980823234234023" during an initial startup phase (e.g., "Phase-1") of host computing device 202.

In contrast, discovery module 110 may discover a storage device having the device identifier "600508B4000014A110001900087A10000" after startup of host computing device 202 is complete. In this example, discovery module 110 may launch or instantiate a background thread or process for discovering this storage device after startup of the host computing device is complete. Similarly, discovery module 110 may discover a storage device having the device identifier "91239D9B90923409FE098D098119323" on an as-needed basis. That is, discovery module 110 may only discover this storage device when an application requests access to this storage device.

In some examples, the systems described herein may only discover storage devices during startup of a host computing device that are specified within a configuration file, such as discovery-classification file 124. For example, discovery module 110 may refrain from discovering (or only discover on an as-needed or an asynchronous basis) storage devices that are not specified within discovery-classification file 124.

In some examples, the systems described herein may, when discovering the storage device in step 306: 1) identify a disk group that is associated with the storage device and then 2) discover all other storage devices within the identified disk group. For example, discovery module 110 in FIG. 1 may determine, as part of host computing device 202 in FIG. 2 (e.g., as part of a cluster management application on host computing device 202), that the storage device identified in step 302 belongs to a disk group named "diskgroup_1." In this example, discovery module 110 may then identify and discover all other storage devices that belong to "diskgroup_1."

In some examples, the systems described herein may also configure a storage device for use upon discovering the same. For example, discovery module 110 in FIG. 1 may, upon discovering a storage device in step 306 as part of host computing device 202, configure this storage device for use by an application or resource.

In some examples, the systems described herein may make a resource available after its associated storage device has been properly discovered and configured. For example, host computing device 202 may bring applications or services online after the storage devices that provide storage for these applications and services have been discovered and configured. In some examples, the systems described herein may make resources available in accordance with priority rankings associated with these resources. For example, host computing device 202 may bring applications or services online in accordance with priority rankings assigned to the applications or services in a configuration file, such as availability-requirements file 122. For example, host computing device 202 may bring the service "critical_service" online first, followed by the service "required_service," and so on in accordance with the priority ranking associated with each application or service identified within availability-requirements file 122.

As detailed above, by configuring host computing devices to selectively discover storage devices during startup based at least in part on the availability requirements of the applications or services that store data on such devices, the systems and methods described herein may enable system administrators to drastically improve the startup performance of host computing devices without compromising the availability requirements of applications or services managed by such host computing devices. As such, these systems and methods may enable cluster management and storage virtualization software vendors to provide solutions that satisfy the uptime requirements of stringent SLAs, even in large-scale environments.

Figure 6:
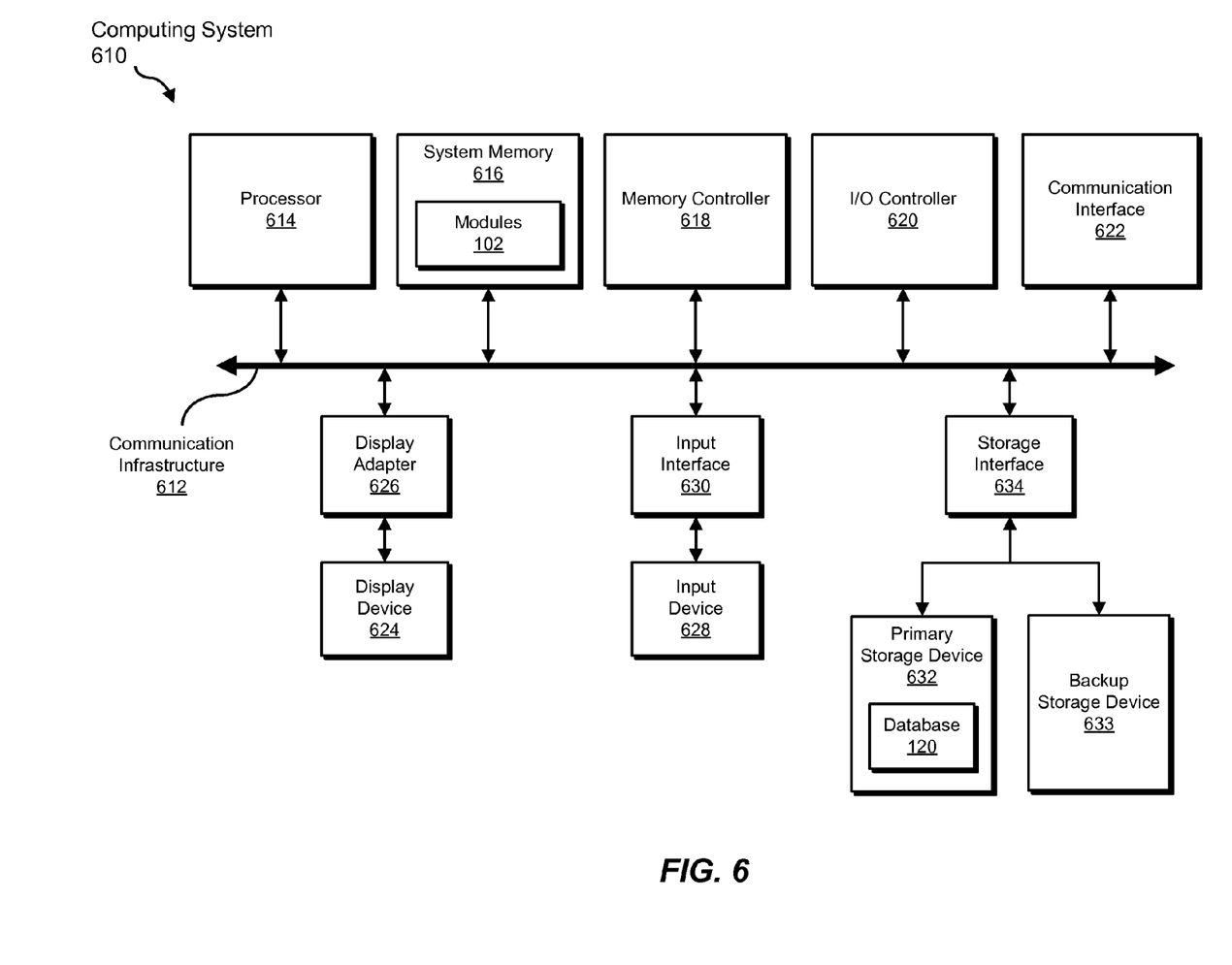
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, discovering, using, retrieving, assigning, storing, making available, and configuring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, discovering, using, retrieving, assigning, storing, making available, and configuring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, discovering, using, retrieving, assigning, storing, making available, and configuring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, discovering, using, retrieving, assigning, storing, making available, and configuring steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, discovering, using, retrieving, assigning, storing, making available, and configuring steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, discovering, using, retrieving, assigning, storing, making available, and configuring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
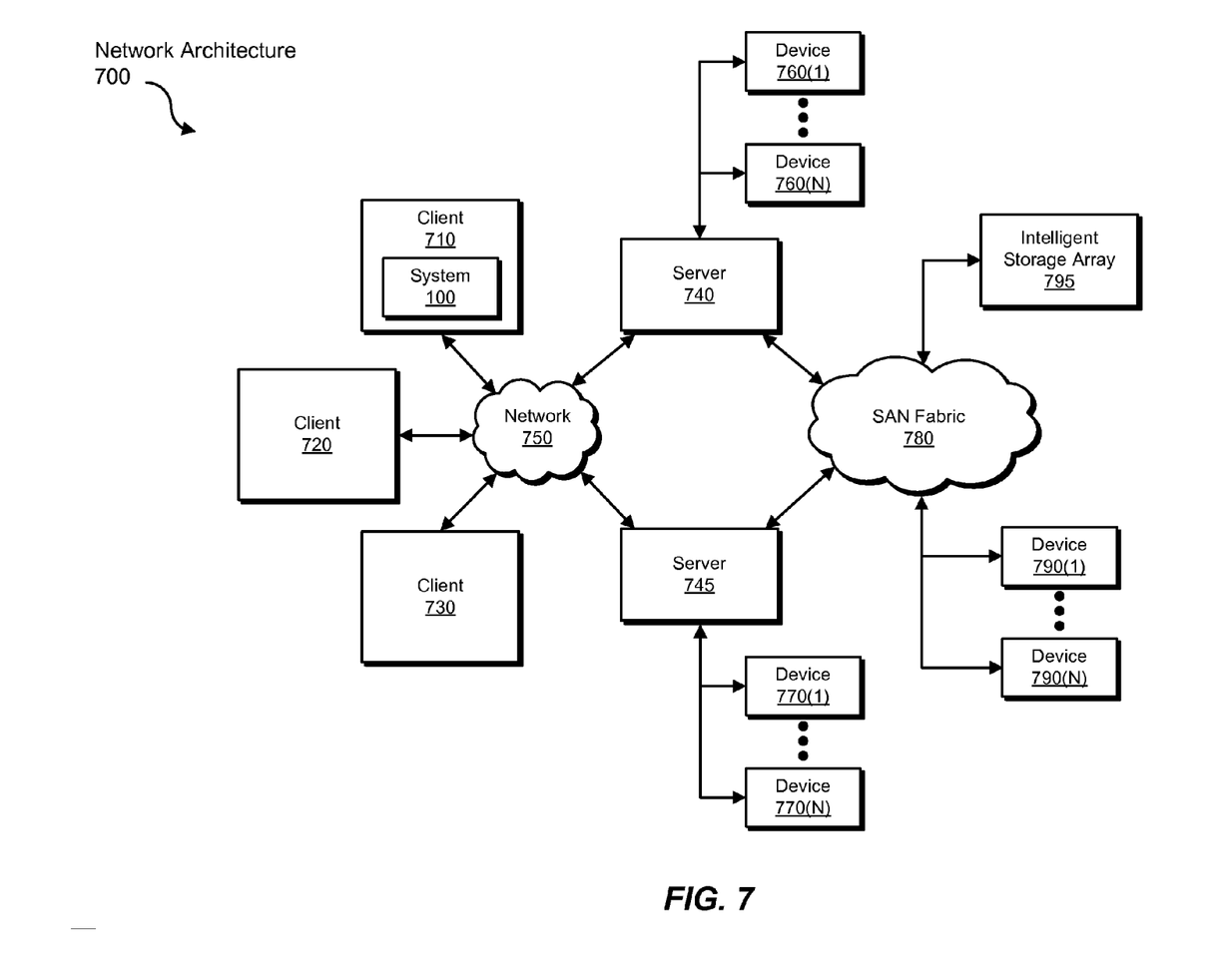
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, discovering, using, retrieving, assigning, storing, making available, and configuring steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for selectively discovering storage devices connected to host computing devices. In one example, such a method may include: 1) identifying at least one storage device connected to the host computing device that provides storage for at least one resource managed by the host computing device, 2) identifying a discovery classification assigned to the storage device that is based at least in part on an availability requirement associated with the resource, and then 3) discovering the storage device in accordance with the discovery classification assigned to the storage device.

In some examples, identifying the storage device may include: 1) identifying a unique identifier associated with the storage device and then 2) using the unique identifier to uniquely identify the storage device. In addition, identifying the discovery classification assigned to the storage device may include retrieving the discovery classification from a configuration file.

In one example, the method may also include, prior to retrieving the discovery classification from the configuration file: 1) identifying the availability requirement associated with the resource, 2) assigning the discovery classification to the storage device based at least in part on the availability requirement associated with the resource, and then 3) storing the discovery classification in the configuration file. In this example, assigning the discovery classification to the storage device based at least in part on the availability requirement associated with the resource may include assigning the discovery classification to the storage device based at least in part on a tiered-storage classification assigned to the storage device.

In some embodiments, the availability requirement may represent a user-assigned availability requirement that specifies making the resource available during startup of the host computing device, making the resource available during a specific startup phase of the host computing device, making the resource available after startup of the host computing device is complete, and/or making the resource available in accordance with a priority ranking associated with the resource. Similarly, the discovery classification may specify discovering the storage device during startup of the host computing device, discovering the storage device during a specific startup phase of the host computing device, discovering the storage device after startup of the host computing device is complete, and/or discovering the storage device on an as-needed basis.

In one example, discovering the storage device in accordance with the discovery classification assigned to the storage device may include discovering the storage device during startup of the host computing device, discovering the storage device during a specific startup phase of the host computing device, discovering the storage device after startup of the host computing device is complete, and/or discovering the storage device on an as-needed basis. In some examples, discovering the storage device may include identifying a disk group associated with the storage device and then discovering all other storage devices within the identified disk group.

In some examples, the method may also include, upon discovering the storage device, configuring the storage device for use by the resource. In this example, the method may also include making the resource available upon configuring the storage device. In one example, making the resource available may include making the resource available in accordance with a priority ranking associated with the resource.

In one embodiment, the host computing device may include a cluster node within a computing cluster and the storage device may include a logical storage device within a virtualized storage environment. In addition, the resource may represent an application managed by the host computing device or a service managed by the host computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, availability-requirement module 104 and/or discovery-classification module 106 in FIG. 1 may transform a property or characteristic of database 120 of host computing device 202 in FIG. 2 by creating and/or modifying availability-requirements file 122 and/or discovery-classification file 124.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for selectively discovering storage devices connected to host computing devices, at least a portion of the method being performed by a host computing device comprising at least one processor, the method comprising:
   identifying at least one storage device connected to the host computing device that provides storage for at least one resource managed by the host computing device;
   identifying a discovery classification assigned to the storage device, wherein the discovery classification assigned to the storage device is based at least in part on an availability requirement of the resource for which the storage device provides storage;
   discovering the storage device in accordance with the discovery classification assigned to the storage device.

2. The method of claim 1, wherein identifying the storage device comprises:
   identifying a unique identifier associated with the storage device;
   using the unique identifier to uniquely identify the storage device.

3. The method of claim 1, wherein identifying the discovery classification assigned to the storage device comprises retrieving the discovery classification from a configuration file.

4. The method of claim 3, further comprising, prior to retrieving the discovery classification from the configuration file:
   identifying the availability requirement of the resource;
   assigning the discovery classification to the storage device based at least in part on the availability requirement of the resource;
   storing the discovery classification in the configuration file.

5. The method of claim 4, wherein assigning the discovery classification to the storage device based at least in part on the availability requirement of the resource comprises assigning the discovery classification to the storage device based at least in part on a tiered-storage classification assigned to the storage device.

6. The method of claim 4, wherein the availability requirement comprises a user-assigned availability requirement that specifies at least one of:
   making the resource available during startup of the host computing device;
   making the resource available during a specific startup phase of the host computing device;
   making the resource available after startup of the host computing device is complete;
   making the resource available in accordance with a priority ranking associated with the resource.

7. The method of claim 1, wherein the discovery classification specifies at least one of:
   discovering the storage device during startup of the host computing device;
   discovering the storage device during a specific startup phase of the host computing device;
   discovering the storage device after startup of the host computing device is complete;
   discovering the storage device on an as-needed basis.

8. The method of claim 1, wherein discovering the storage device in accordance with the discovery classification assigned to the storage device comprises at least one of:
   discovering the storage device during startup of the host computing device;
   discovering the storage device during a specific startup phase of the host computing device;
   discovering the storage device after startup of the host computing device is complete;
   discovering the storage device on an as-needed basis.

9. The method of claim 1, wherein discovering the storage device comprises:
   identifying a disk group associated with the storage device;
   discovering all other storage devices within the identified disk group.

10. The method of claim 1, further comprising, upon discovering the storage device, configuring the storage device for use by the resource.

11. The method of claim 10, further comprising, upon configuring the storage device, making the resource available.

12. The method of claim 11, wherein making the resource available comprises making the resource available in accordance with a priority ranking associated with the resource.

13. The method of claim 1, wherein the host computing device comprises a cluster node within a computing cluster.

14. The method of claim 1, wherein the storage device comprises a logical storage device within a virtualized storage environment.

15. The method of claim 1, wherein the resource comprises at least one of:
   an application managed by the host computing device;
   a service managed by the host computing device.

16. A system for selectively discovering storage devices connected to a host computing device, the system comprising:
   an identification module programmed to:
      identify at least one storage device connected to the host computing device that provides storage for at least one resource managed by the host computing device;
      identify a discovery classification assigned to the storage device, wherein the discovery classification assigned to the storage device is based at least in part on an availability requirement of the resource for which the storage device provides storage;
   a discovery module programmed to discover the storage device in accordance with the discovery classification assigned to the storage device;
   at least one processor configured to execute the identification module and the discovery module.

17. The system of claim 16, further comprising:
   an availability-requirement module programmed to identify the availability requirement of the resource;
   a discovery-classification module programmed to assign the discovery classification to the storage device based at least in part on the availability requirement of the resource.

18. The system of claim 17, wherein the discovery-classification module assigns the discovery classification to the storage device based at least in part on a tiered-storage classification assigned to the storage device.

19. The system of claim 16, wherein the discovery module discovers the storage device in accordance with the discovery classification assigned to the storage device by at least one of:
   discovering the storage device during startup of the host computing device;

discovering the storage device during a specific startup phase of the host computing device;

discovering the storage device after startup of the host computing device is complete;

discovering the storage device on an as-needed basis.

20. A computer-readable-storage medium comprising computer-executable instructions that, when executed by at least one processor of a host computing device, cause the host computing device to:

identify at least one storage device connected to the host computing device that provides storage for at least one resource managed by the host computing device;

identify a discovery classification assigned to the storage device, wherein the discovery classification assigned to the storage device is based at least in part on an availability requirement of the resource for which the storage device provides storage;

discover the storage device in accordance with the discovery classification assigned to the storage device.

* * * * *